United States Patent
Komatsu

(10) Patent No.: US 12,254,716 B2
(45) Date of Patent: Mar. 18, 2025

(54) PERSONAL AUTHENTICATION APPARATUS, PERSONAL AUTHENTICATION METHOD, AND STORAGE MEDIUM

(71) Applicant: CANON KABUSHIKI KAISHA, Tokyo (JP)

(72) Inventor: Takayuki Komatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 357 days.

(21) Appl. No.: 17/817,743

(22) Filed: Aug. 5, 2022

(65) Prior Publication Data

US 2023/0083725 A1 Mar. 16, 2023

(30) Foreign Application Priority Data

Sep. 10, 2021 (JP) .................. 2021-148078

(51) Int. Cl.
- *G06V 40/18* (2022.01)
- *G06T 7/73* (2017.01)
- *G06V 10/82* (2022.01)
- *G06V 40/16* (2022.01)

(52) U.S. Cl.
CPC .............. *G06V 40/197* (2022.01); *G06T 7/74* (2017.01); *G06V 10/82* (2022.01); *G06V 40/171* (2022.01); *G06V 40/193* (2022.01); G06T 2207/10048 (2013.01); G06T 2207/30196 (2013.01)

(58) Field of Classification Search
CPC .... G06V 40/197; G06V 40/171; G06V 10/82; G06V 40/193; G06T 7/74; G06T 2207/10048; G06T 2207/30196
See application file for complete search history.

(56) References Cited

U.S. PATENT DOCUMENTS

| | | | | |
|---|---|---|---|---|
| 7,216,982 | B2 * | 5/2007 | Fujimatsu | G06V 40/19 351/221 |
| 9,098,728 | B2 * | 8/2015 | Kishigami | G06F 21/84 |
| 10,592,740 | B2 * | 3/2020 | Abe | A61B 3/10 |
| 10,824,859 | B2 * | 11/2020 | Kanamori | G06F 21/32 |
| 11,017,225 | B2 * | 5/2021 | Kanamori | G06V 10/803 |
| 11,295,127 | B2 * | 4/2022 | Yoshikawa | G06V 40/193 |
| 12,076,087 | B2 * | 9/2024 | Yokoyama | G06V 40/171 |

FOREIGN PATENT DOCUMENTS

| | | |
|---|---|---|
| WO | 2014/046206 A1 | 3/2014 |
| WO | 2017/014137 A1 | 1/2017 |

* cited by examiner

*Primary Examiner* — Gregory M Desire
(74) *Attorney, Agent, or Firm* — VENABLE LLP

(57) ABSTRACT

A personal authentication apparatus comprises an acquisition unit configured to acquire an eyeball image of a user, an estimation unit configured to estimate, based on a ghost captured in the eyeball image, information on eyeglasses worn by the user, and an authentication unit configured to perform personal authentication on the user based on the eyeball image and the information on the eyeglasses.

15 Claims, 16 Drawing Sheets

FIG. 2
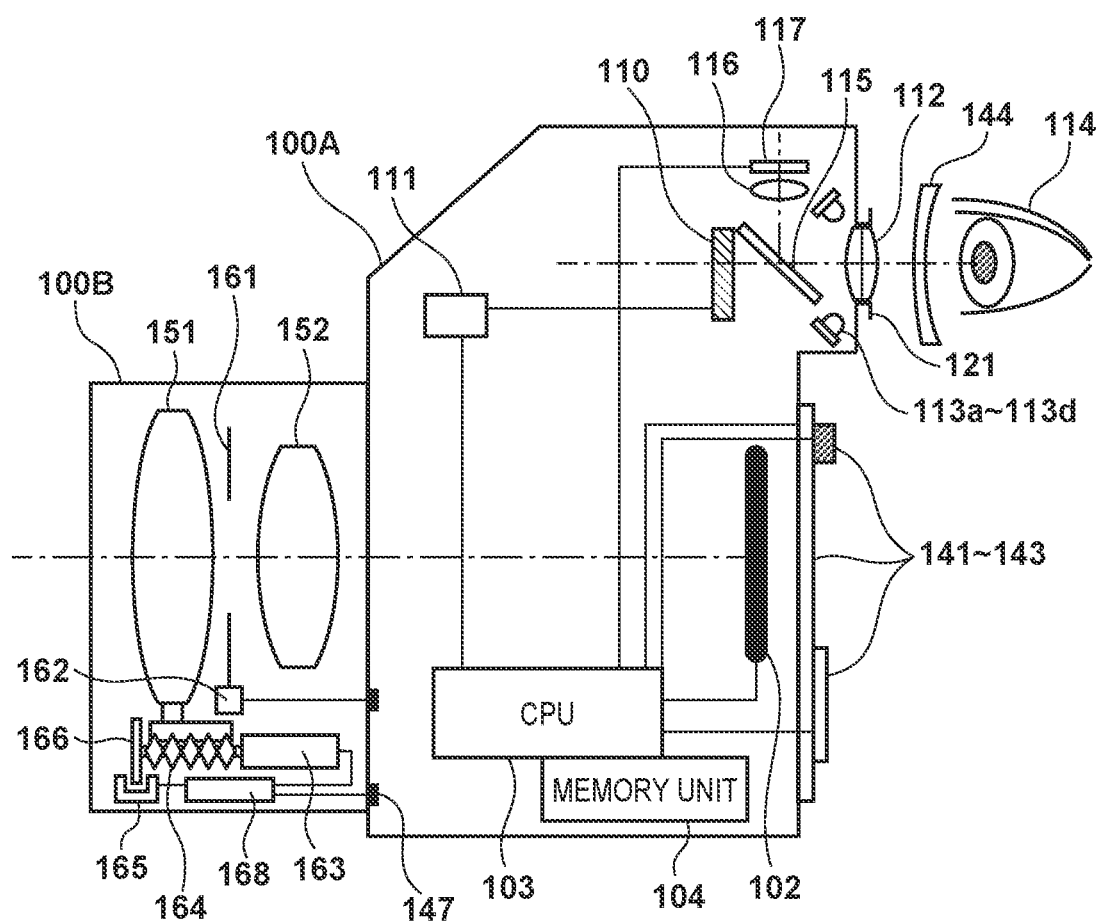
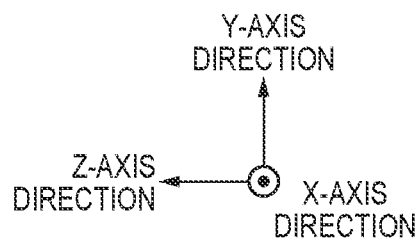

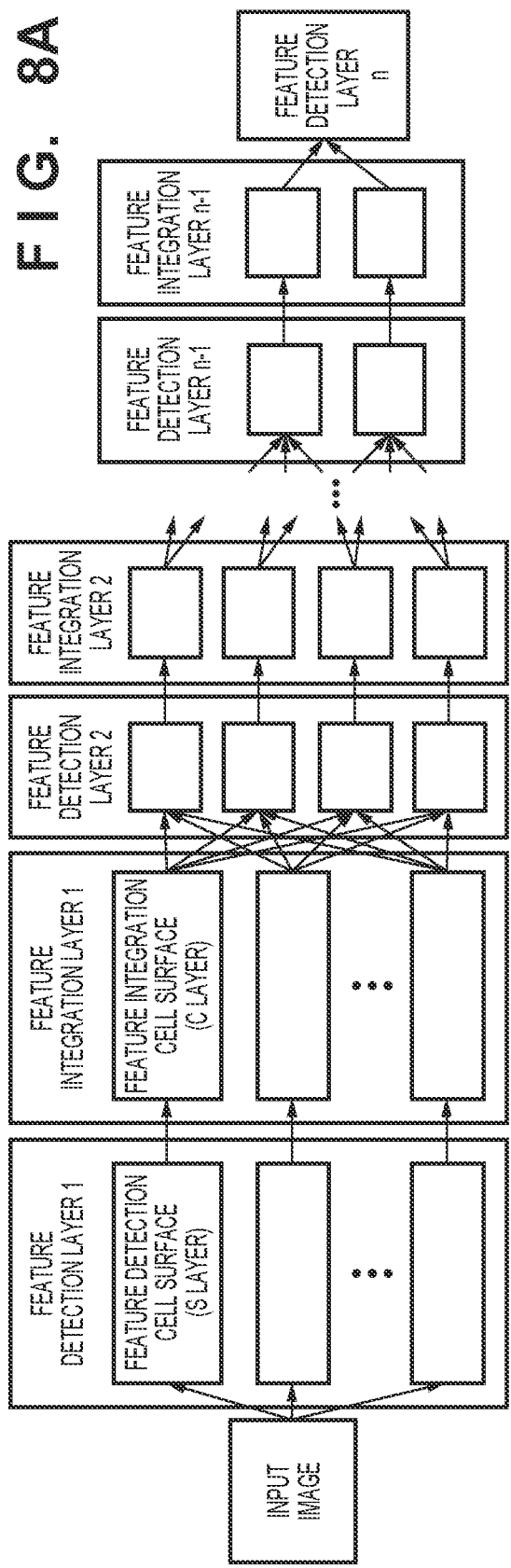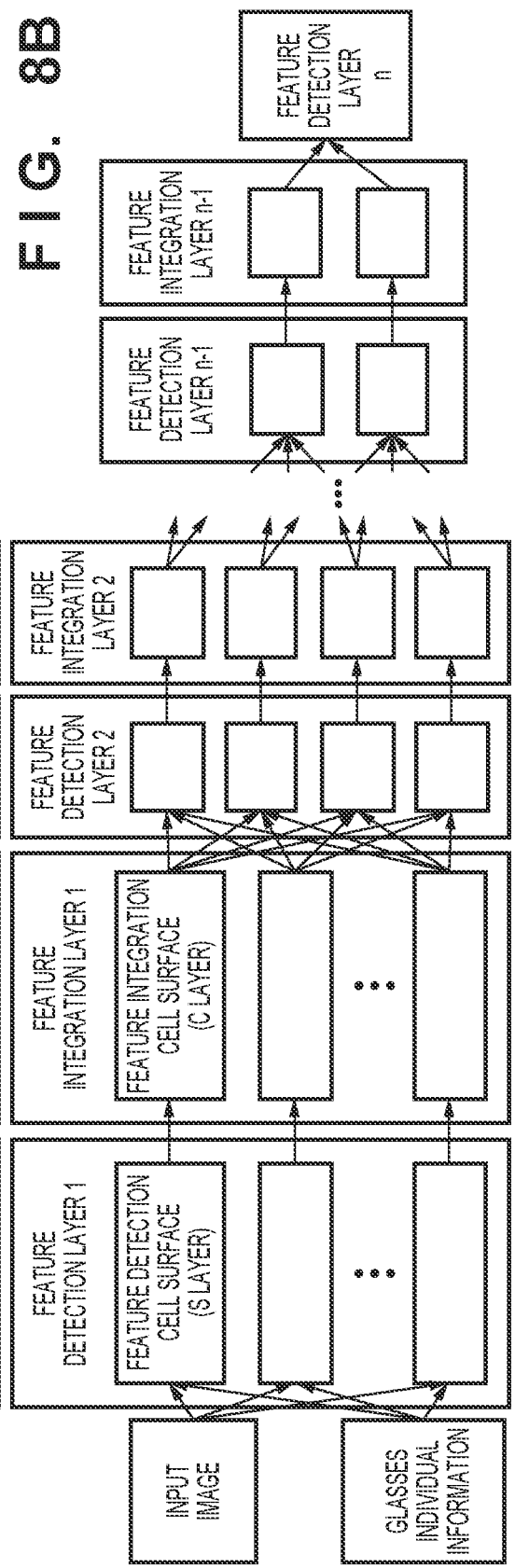

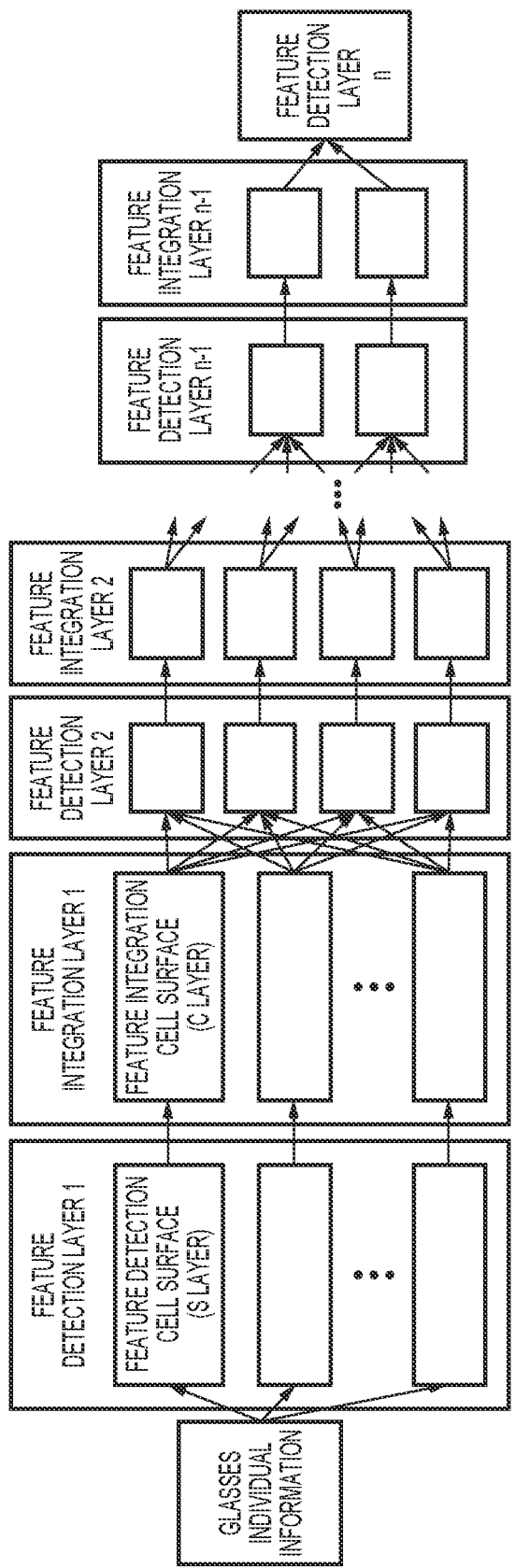

F I G. 12A
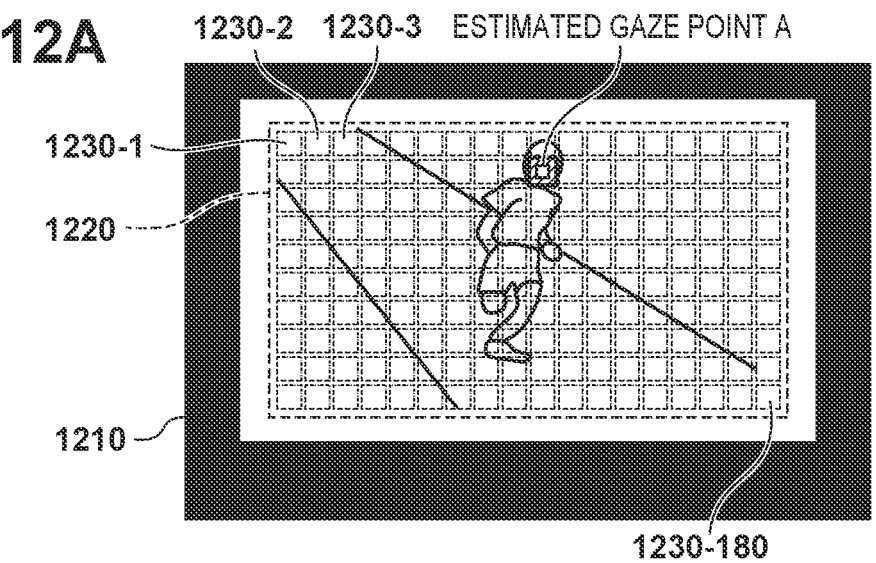
F I G. 12B
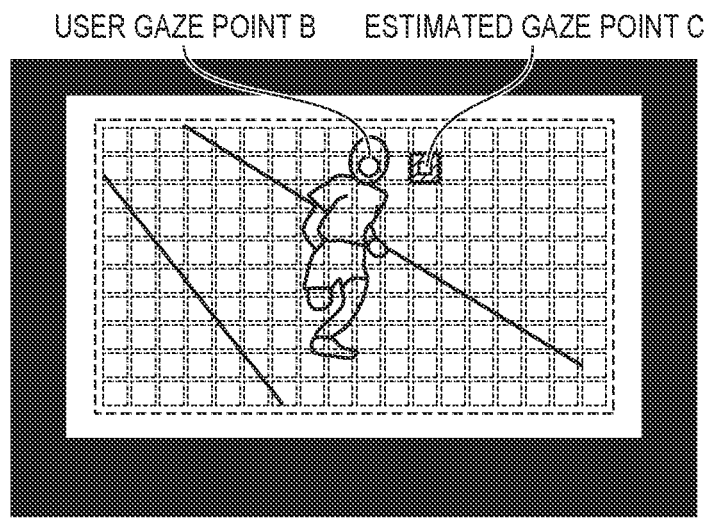
F I G. 12C
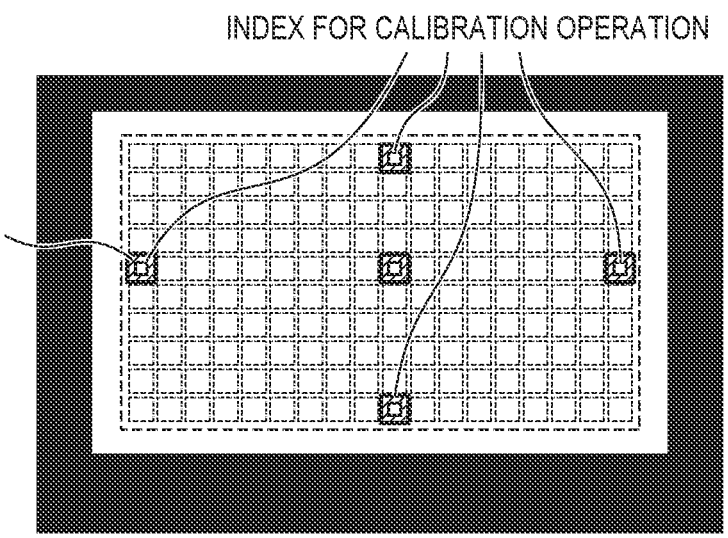

F I G. 15

| No | TYPE OF GLASSES | PERSONAL AUTHENTICATION RESULT | CORRECTION COEFFICIENT |
|---|---|---|---|
| 1 | NO GLASSES | USER 1 | COEFFICIENT A |
| 2 | GLASSES X | USER 1 | COEFFICIENT B |
| 3 | GLASSES Y | USER 2 | COEFFICIENT C |
| 4 | GLASSES Z | USER 2 | COEFFICIENT D |

PERSONAL AUTHENTICATION APPARATUS, PERSONAL AUTHENTICATION METHOD, AND STORAGE MEDIUM

BACKGROUND OF THE INVENTION

Field of the Invention

The present invention relates to a personal authentication technique using an eyeball image.

Description of the Related Art

There has been known a technique of using an eyeball image for detecting a line-of-sight direction of a person and for performing personal authentication. With such a technique, a problem occurs when a subject is wearing eyeglasses. Specifically, ghost light caused by the eyeglasses affects the accuracy of the line-of-sight detection and personal authentication.

International Publication No. 2014/046206 discloses a method as a countermeasure for this problem. Specifically, the method includes determining the refractive index of the eyeglasses during calibration for the line-of-sight detection, and correcting gaze point detection analysis accordingly.

International Publication No. 2017/014137 discloses a method of capturing images of an eyeball in three directions, and using polarization information in the three directions for line-of-sight detection, so that portions in the images that are invisible due to reflected light on the surface of the eyeglasses can be corrected with the plural information.

Unfortunately, the method disclosed in International Publication No. 2014/046206 involves the following problem. Specifically, incidence of the ghost light leads to reflection of saturated light on a pupil, resulting in an incomplete eyeball image which is directly related to compromised accuracy of the line-of-sight detection.

The apparatus according to International Publication No. 2017/014137 is complex, expensive, and large, and on top of that, involves a wide range of ghost light. Thus, the influence of such ghost light is not necessarily eliminated by the image in any of the directions.

Personal authentication applying the techniques described in International Publication No. 2014/046206 and International Publication No. 2017/014137 similarly involve such problems.

SUMMARY OF THE INVENTION

The present invention has been made in view of the above, and suppresses deterioration of accuracy of the personal authentication, even when performing the personal authentication using eyeball image with a subject wearing eyeglasses.

According to a first aspect of the present invention, there is provided a personal authentication apparatus comprising: at least one processor or circuit configured to function as: an acquisition unit configured to acquire an eyeball image of a user; an estimation unit configured to estimate, based on a ghost captured in the eyeball image, information on eyeglasses worn by the user; and an authentication unit configured to perform personal authentication on the user based on the eyeball image and the information on the eyeglasses.

According to a second aspect of the present invention, there is provided a personal authentication method comprising: acquiring an eyeball image of a user; estimating, based on a ghost captured in the eyeball image, information on eyeglasses worn by the user; and performing personal authentication on the user based on the eyeball image and the information on the eyeglasses.

According to a third aspect of the present invention, there is provided a non-transitory computer readable storage medium storing a program causing a computer to function as each unit of a personal authentication apparatus, the apparatus comprising: at least one processor or circuit configured to function as: an acquisition unit configured to acquire an eyeball image of a user; an estimation unit configured to estimate, based on a ghost captured in the eyeball image, information on eyeglasses worn by the user; and an authentication unit configured to perform personal authentication on the user based on the eyeball image and the information on the eyeglasses.

Further features of the present invention will become apparent from the following description of exemplary embodiments with reference to the attached drawings.

BRIEF DESCRIPTION OF THE DRAWINGS

FIG. 2 is a diagram illustrating a schematic configuration of the digital still camera.

FIG. 8A to FIG. 8C are diagrams illustrating a basic configuration of a CNN for estimating a gaze point position from image data input.

FIG. 12A to FIG. 12C are diagrams illustrating a visual field in a finder according to a third embodiment.

FIG. 15 is a diagram illustrating a relationship between each person and each correction coefficient data according to the third embodiment.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be

First Embodiment

Figure 1A:
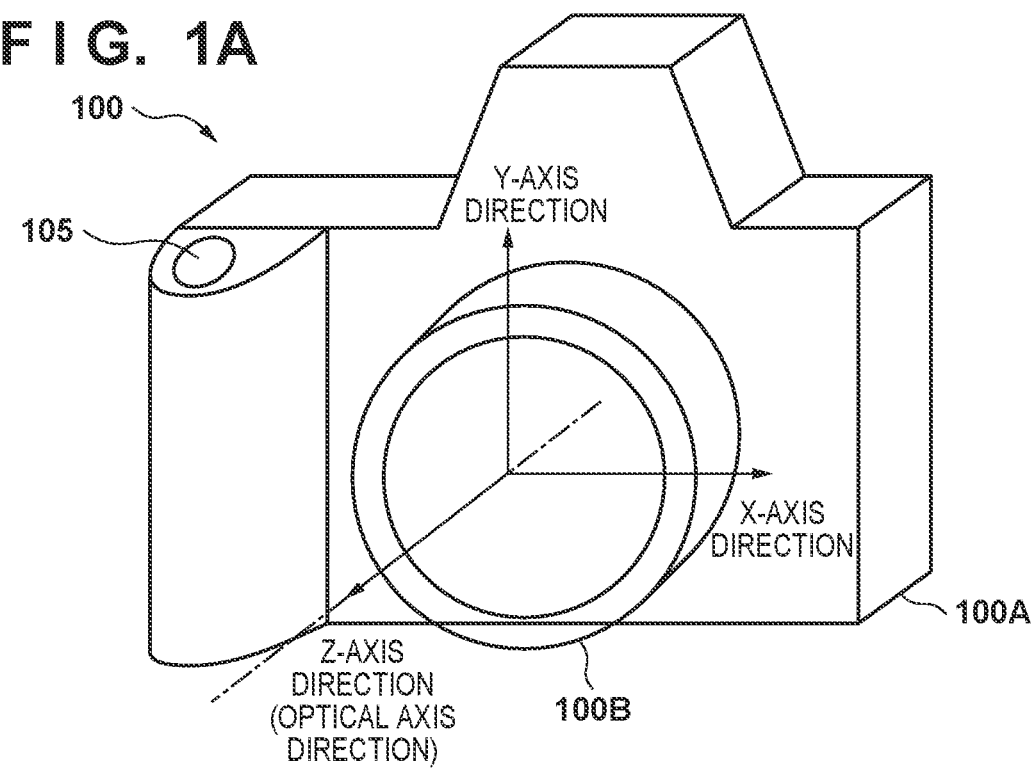
FIG. 1A and FIG. 1B are diagrams illustrating an outer appearance of a digital still camera according to a first embodiment of a personal authentication apparatus of the present invention.
Figure 1B:
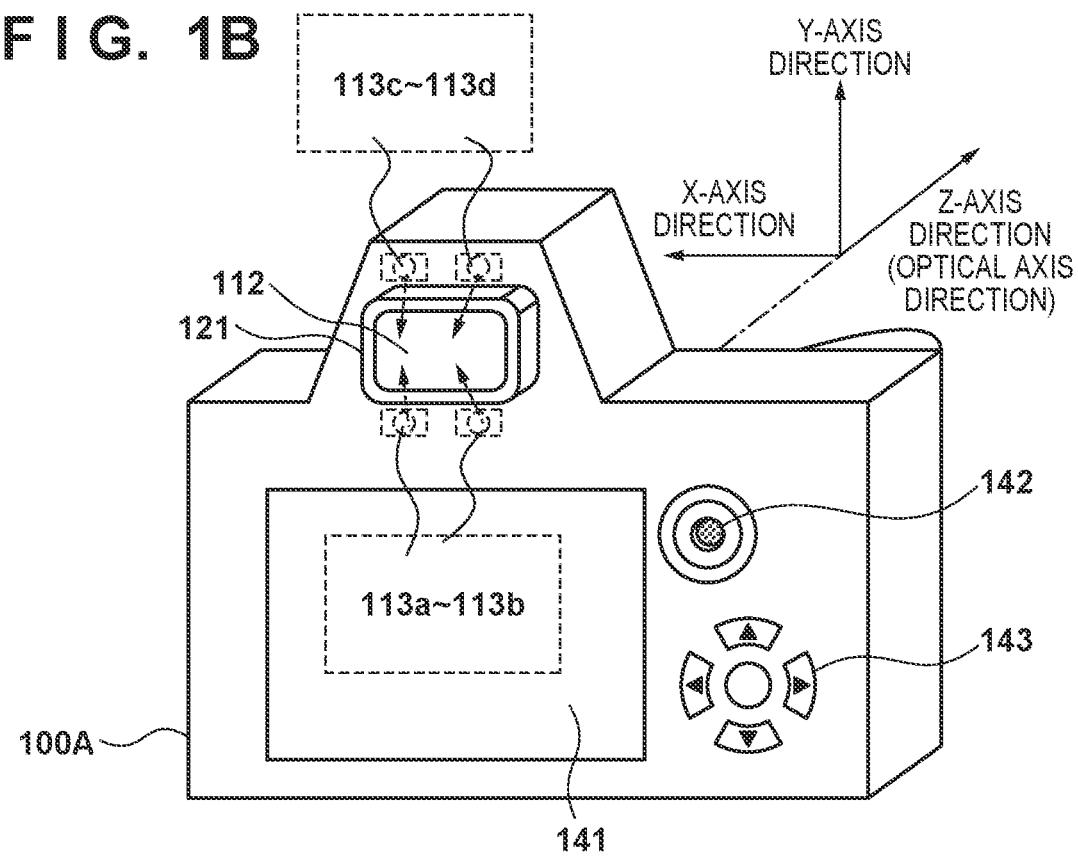

FIG. 1A and FIG. 1B are diagrams illustrating an outer appearance of a digital still camera 100 according to a first embodiment of personal authentication apparatus of the present invention. FIG. 1A is a front perspective view of the digital still camera 100, and FIG. 1B is a rear perspective view of the digital still camera 100.

In the present embodiment, as illustrated in FIG. 1A, the digital still camera 100 is configured with an imaging lens 100B detachably attached to a camera main body 100A. In the camera main body 100A, a release button 105 that is an operation member configured to receive an image capturing operation from a user is arranged.

As illustrated in FIG. 1B, on a rear surface of the digital still camera 100, an eyepiece window frame 121 and an eyepiece lens 112 are arranged, through which the user looks a display element 110, described below, included inside the camera. Also, a plurality of illuminants 113a, 113b, 113c, and 113d that illuminate an eyeball are arranged around the eyepiece lens 112.

FIG. 2 is a cross-sectional view of a camera housing taken along a YZ plane defined by the Y-axis and the Z-axis illustrated in FIG. 1A, and illustrates a schematic configuration of the digital still camera 100. In FIG. 1A, FIG. 1B, and FIG. 2, the corresponding components are denoted with the same reference signs.

In FIG. 2, the imaging lens 100B for an interchangeable-lens camera is attached to the camera main body 100A. In the present embodiment, for convenience of description, two lenses 151 and 152 are illustrated as being included in the interior of the imaging lens 100B. However, actually, a larger number of lenses are included as is well known.

The camera main body 100A includes an image sensor 102 arranged on a planned image forming plane of the imaging lens 100B. The camera main body 100A incorporates a CPU 103 configured to control the entire camera, and a memory unit 104 configured to record images captured by the image sensor 102. The display element 110 including a liquid crystal or the like configured to display the captured image, a display element driving circuit 111 configured to drive the display element 110, and the eyepiece lens 112 configured to observe a subject image displayed on the display element 110 are arranged in the eyepiece window frame 121.

Figure 5A:
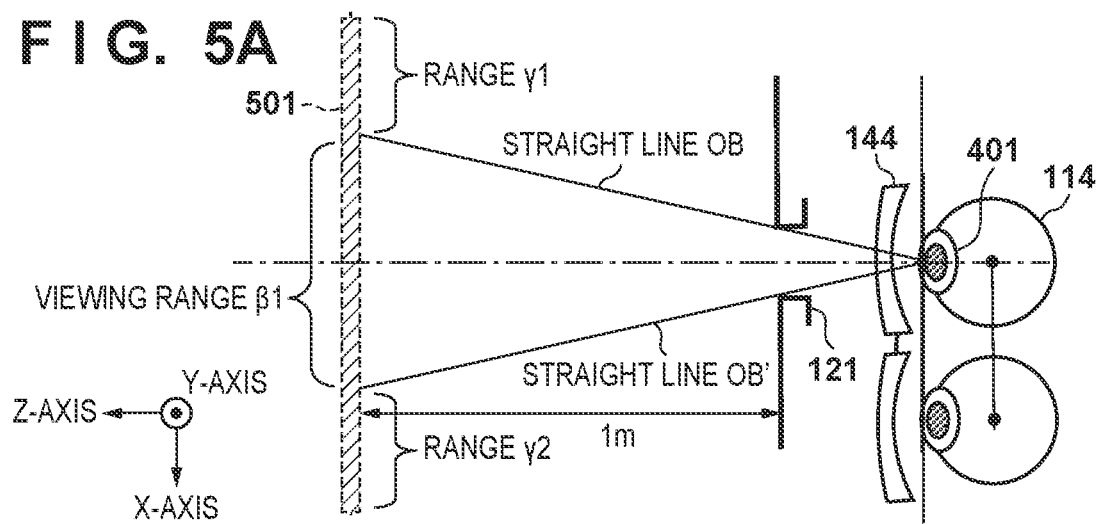
FIG. 5A to FIG. 5C are diagrams illustrating viewing states of a user viewing a display element.
Figure 5B:
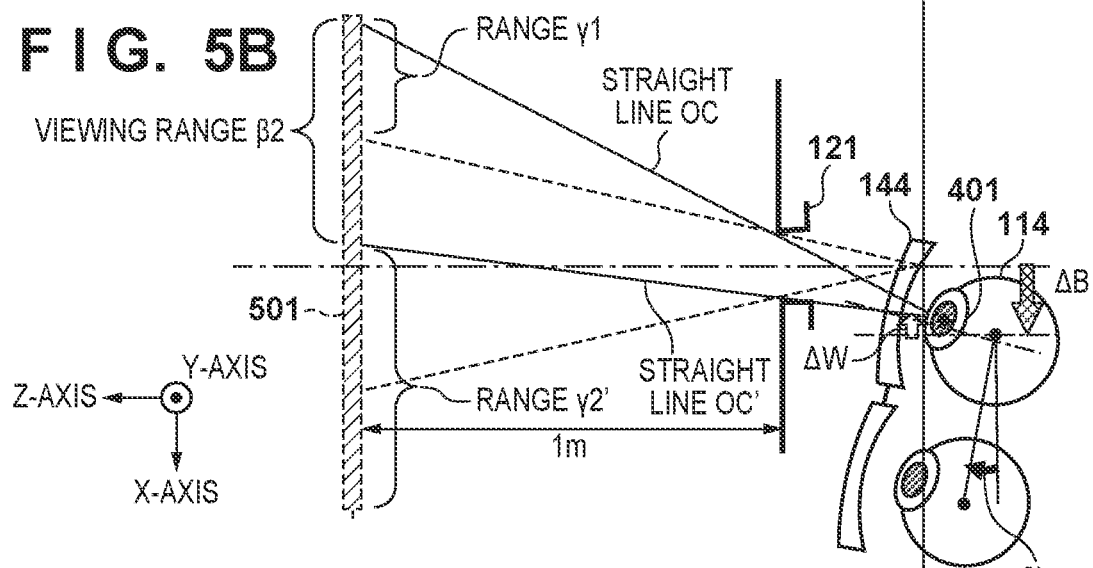
Figure 5C:
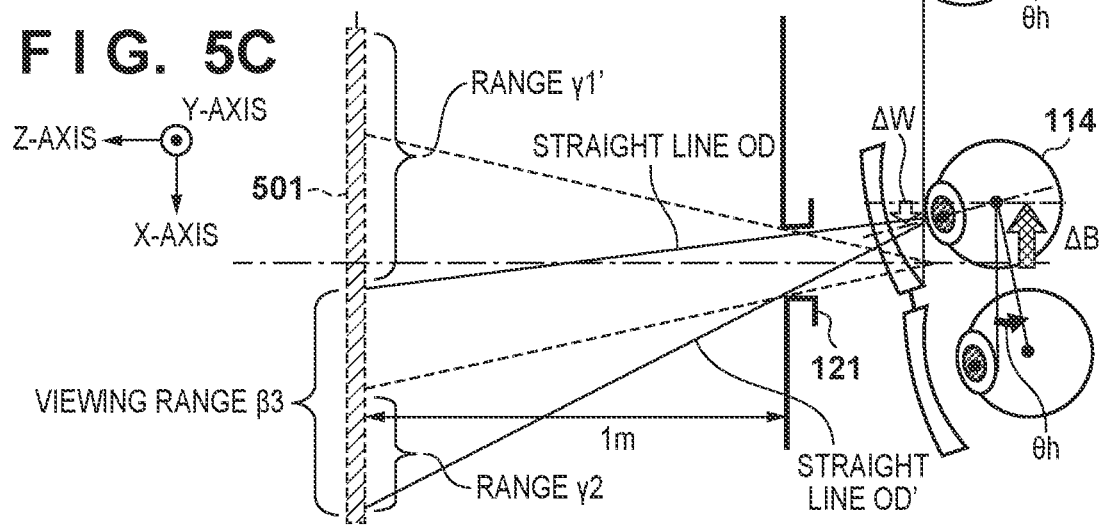

The user can see a virtual image 501 on the display element 110 while being in states illustrated in FIG. 5A to FIG. 5C, by looking inside the eyepiece window frame 121. Specifically, with the eyepiece lens 112, the virtual image 501 on the display element 110 is formed at a position separated from the eyepiece lens 112 by about 50 cm to 2 m, while being in a state of being enlarged from the actual size. Such a virtual image 501 is visually recognized by the user. FIGS. 5A to 5C illustrate assuming that the virtual image is formed at a position separated by 1 m.

The illuminants 113a to 113d are light sources configured to illuminate an eyeball 114 of a photographer, include infrared light emitting diodes, and are arranged around the eyepiece lens 112. The illuminants 113a to 113d are used for detecting the line-of-sight direction from a relationship between a reflected image by cornea reflection of these illuminants and a pupil.

An image of the eyeball illuminated and the cornea reflected image obtained with the illuminants 113a to 113d transmit through the eyepiece lens 112, and then are reflected by a beam splitter 115. Then, with a light receiving lens 116, the image is formed on an eyeball image sensor 117, such as a CCD, having photoelectric conversion elements being two-dimensionally arranged. The light receiving lens 116 is arranged to achieve a conjugated imaging relationship between the pupil of the eyeball 114 of the photographer and the eyeball image sensor 117. From the positional relationship between the eyeball image formed on the eyeball image sensor 117 and the cornea reflected image obtained with the light sources 113a and 113b, the line-of-sight direction can be detected using a predetermined algorithm described below. In the present embodiment, the photographer (subject) is assumed to be wearing an optical member, such as eyeglasses 144 for example, which is positioned between the eyeball 114 and the eyepiece window frame 121.

The imaging lens 100B includes a diaphragm 161, a diaphragm drive apparatus 162, a lens drive motor 163, a lens drive member 164, and a photocoupler 165. The lens drive member 164 includes a gear and the like. The photocoupler 165 detects a rotation of a pulse plate 166 that rotates in conjunction with the lens drive member 164, and notifies a focus adjustment circuit 168.

The focus adjustment circuit 168 adjusts the imaging lens 100B to be in a focus state by driving the lens drive motor 163 for a predetermined amount, based on information on the amount of rotation of the lens drive member 164 and an amount of lens driving from the camera side. Note that the imaging lens 100B exchanges signals with the camera main body 100A via a mount contact point 147 of the camera main body 100A.

Figure 3:
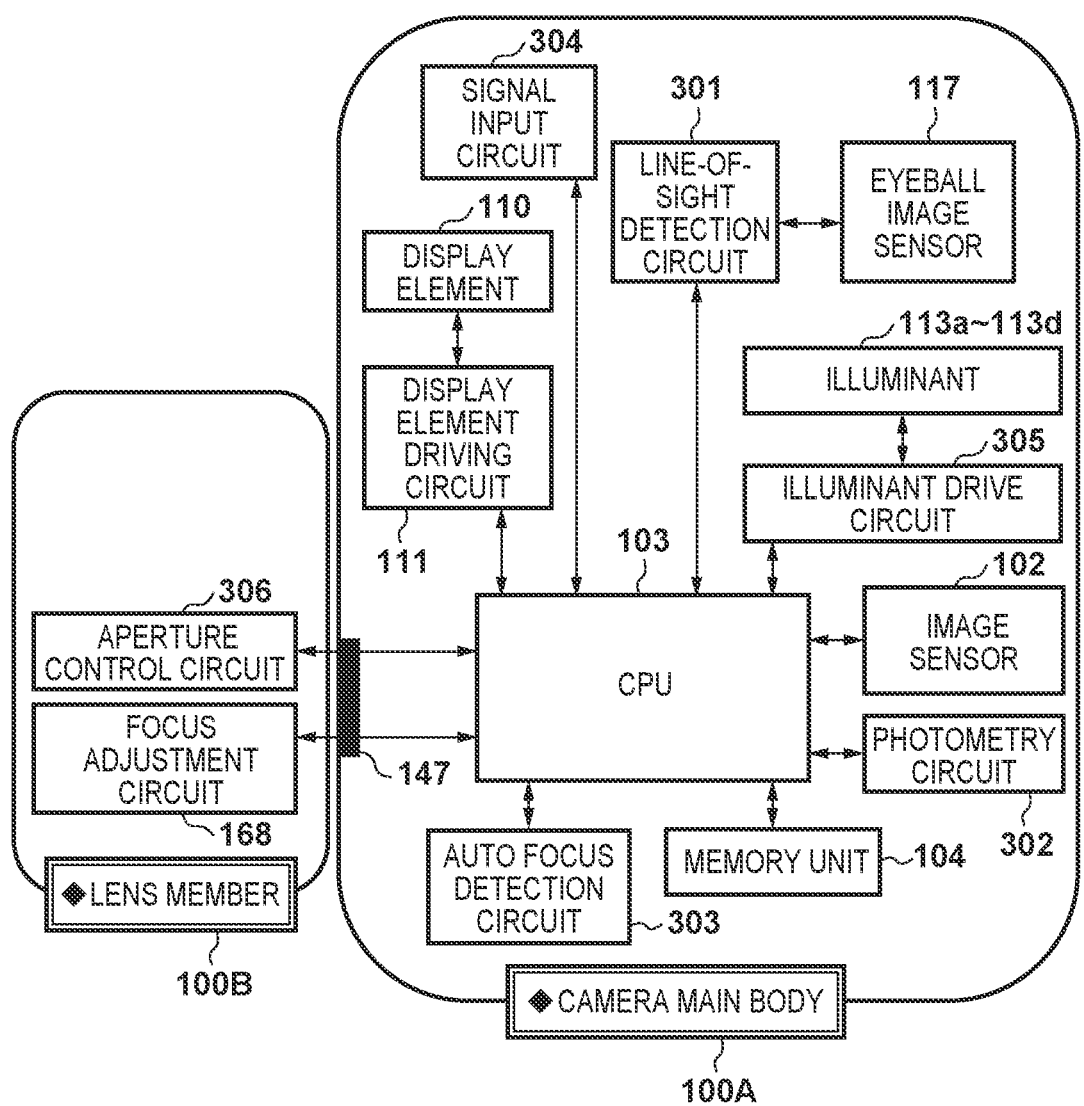
FIG. 3 is a diagram illustrating a block configuration of the digital still camera.

FIG. 3 is a block diagram illustrating an electrical configuration of the digital still camera 100. The CPU 103 incorporated in the camera main body 100A is connected to a line-of-sight detection circuit 301, a photometry circuit 302, an auto focus detection circuit 303, a signal input circuit 304, the display element driving circuit 111, and an illuminant drive circuit 305. The CPU 103 is further connected to the focus adjustment circuit 168 arranged in the imaging lens 100B and to a diaphragm control circuit 306 included in the diaphragm drive apparatus 162, via the mount contact point 147. The memory unit 104 provided for the CPU 103 includes a storage area for a captured image signal from the image sensor 102 and the eyeball image sensor 117, and a storage area for line-of-sight correction data for correction for a difference in line-of-sight between among persons as described below.

The line-of-sight detection circuit 301 performs A/D conversion on an eyeball image signal from the eyeball image sensor 117, and transmits the image information to the CPU 103. The CPU 103 extracts feature points of the eyeball image required for the line-of-sight detection in accordance with a predetermined algorithm described below, and further calculates the line-of-sight of the photographer from the position of each feature point.

Based on a signal obtained from the image sensor 102 also serving as a photometric sensor, the photometry circuit 302 acquires a luminance signal corresponding to the brightness of a field, performs amplification, logarithmic compression, and A/D conversion on the signal, and transmits the signal to the CPU 103 as field luminance information.

The auto focus detection circuit 303 performs A/D conversion on signals from a plurality of pixels used for phase difference detection in the image sensor 102, and transmits the signals to the CPU 103. The CPU 103 calculates a defocus amount corresponding to each focus detection point from the signals from the plurality of pixels. This technique is what is known as on-imaging plane phase difference AF and is a known technique.

Figure 4A:
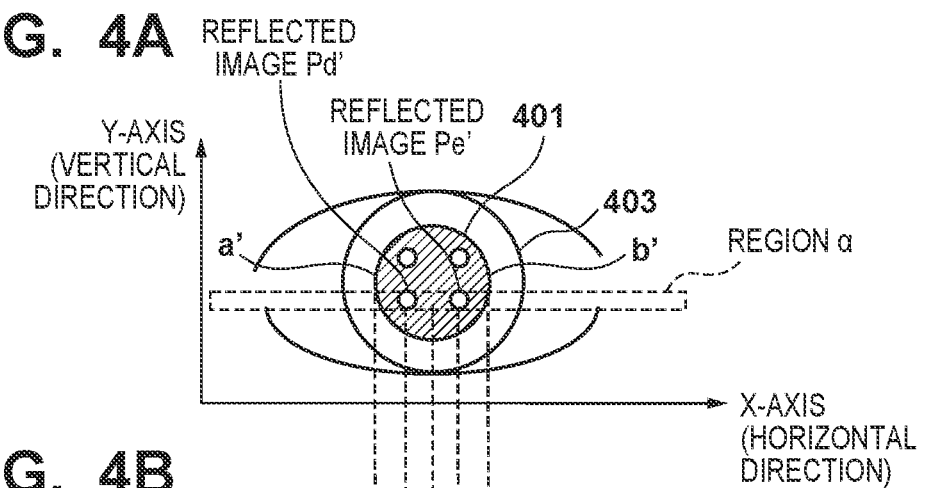
FIG. 4A and FIG. 4B are schematic diagrams of an eyeball image projected on an eyeball image sensor.
Figure 4B:
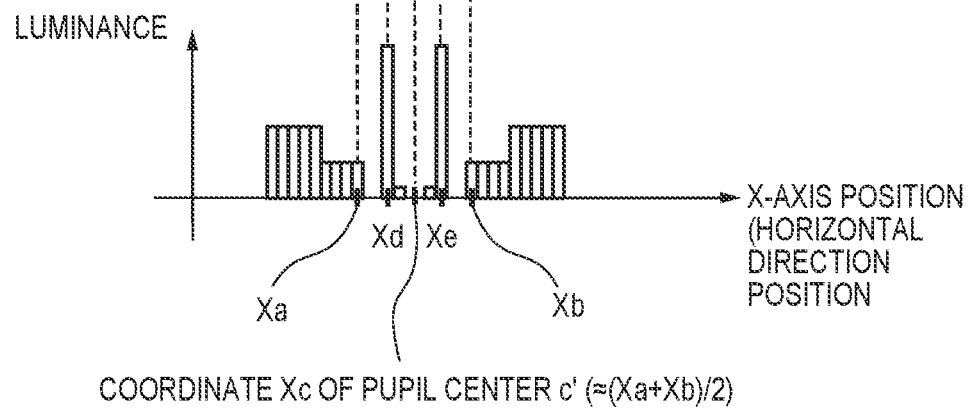

FIG. 4A and FIG. 4B are diagrams illustrating an output from the eyeball image sensor 117. FIG. 4A illustrates, as an image example, an image of a reflected image obtained from the eyeball image sensor 117. FIG. 4B illustrates a signal output intensity of the eyeball image sensor 117 in a region a of the image example in FIG. 4A. Note that in FIG. 4A and FIG. 4B, the horizontal direction is defined as the X-axis and the vertical direction is defined as the Y-axis.

Furthermore, coordinates of cornea reflected images Pd' and Pe' formed by the illuminants 113a and 113b in the X-axis direction (horizontal direction) are defined as Xd and Xe. Coordinates of images a' and b' formed by beams from end portions 401a and 401b of a pupil 401 in the X-axis direction are defined as Xa and Xb.

In the example luminance information (example of signal intensity) in FIG. 4B, the luminance at an extremely high level is obtained at the position Xd and Xe corresponding to the images Pd' and Pe' formed by cornea reflected light with illuminants 113a and 113b. A luminance at an extremely low level is obtained in a region between the coordinates Xa and Xb corresponding to the region of the pupil 401 excluding the positions Xd and Xe described above. A luminance of a value between these two types of luminance levels is obtained in regions corresponding to the region of an iris 403 on the outer side of the pupil 401, that is, a region with a value of the X coordinate being smaller than Xa and a region with a value of the X coordinate being larger than Xb. Based on information on the variation of the luminance level with respect to the X coordinate positions, the X coordinates Xd and Xe of the images Pd' and Pe' formed by cornea reflected light with the illuminant 113a and 113b, and the X coordinates Xa and Xb of the pupil end images a' and b' can be obtained.

When a rotational angle θx of the optical axis of the eyeball 114 with respect to the optical axis of the light receiving lens 116 is small, a coordinate Xc of the position (denoted as c') corresponding to the center c of the pupil the image of which is formed on the eyeball image sensor 117 can be expressed as $Xc \approx (Xa+Xb)/2$.

Based on these, the X coordinate of the position c' corresponding to the center of the pupil the image of which is formed on the eyeball image sensor 117, and the coordinates of the cornea reflected images Pd' and Pe' obtained by the illuminants 113a and 113b can be estimated.

FIG. 4A illustrates an example of calculation for the rotation angle θx of an eyeball of the user rotating within a plane orthogonal to the Y-axis. The same applies to a method of calculating a rotation angle θy of the eyeball of the user rotating within a plane orthogonal to the X-axis.

A state of looking through the eyepiece window frame 121 will be described with reference to FIG. 5A to FIG. 5C. FIG. 5A to FIG. 5C are schematic upper views illustrating a state where the user is visually recognizing the virtual image 501 on the display element 110, through the eyepiece window frame 121 and the eyepiece lens 112, as viewed in a positive direction on the Y-axis. In FIG. 5A to FIG. 5C, the eyepiece lens 112 illustrated in FIG. 1A and FIG. 1B is omitted, for the sake of description.

The user is visually recognizing the virtual image 501 that is enlarged by the eyepiece lens 112, not illustrated in FIG. 5A to FIG. 5C, to be larger than the actual size of the display element 110. Typically, the optical system of the finder is adjusted to make a virtual image formed at a position at a distance of several tens of cm to 2 m from the eyepiece lens 112. The figure of the present embodiment illustrates assuming that the virtual image is formed at a distance of 1 m. Furthermore, in the states illustrated in FIG. 5A to FIG. 5C, the user is wearing the eyeglasses 144, so that the eyeball 114 and the eyepiece window frame 121 are separated from each other with the eyeglasses 144 provided in between.

FIG. 5A illustrates a state in which the user is gazing at substantially the center of the screen, with the position of the eyeball center substantially matching the optical axis center of the eyepiece window frame 121 and the display element 110. The user in this state is seeing a region defined by a visual field range β1. To see a range γ1 at an end portion of the screen not visible in such a state, the user tends to largely move his or her eyeball together with his or her head through a translational movement in the positive direction on the X-axis (downward relative to the drawing sheet) as illustrated in FIG. 5B.

This translational movement results in a shift of the center position of the eyeball 114 in a direction orthogonal to the optical axis. After the shift, a straight line OC and a straight line OC' connecting the pupil 401 of the eyeball with ends of the eyepiece window frame 121 form a new visual field range β2. The visual field range β2 is shifted in the negative direction on the X-axis (upward relative to the drawing sheet), to include the range γ1 that was invisible before the translational movement. Thus, the translational movement of the user has successfully resulted in making the range γ1 visible. Still, an out of visual field range γ2' becomes larger than the range γ2 in FIG. 5A, on the downward side relative to the drawing sheet.

To see a range γ2 of an end portion of the screen that is invisible in the state illustrated in FIG. 5A and is opposite to the one described above, the user similarly moves his or her head in the negative direction on the X-axis (upward relative to the drawing sheet) that is opposite to the direction for achieving the state in FIG. 5B, through a translational movement. Then, the state illustrated in FIG. 5C is achieved. Through the translational movement of the head in a direction opposite to that for achieving the state illustrated in FIG. 5B, a new visual field range β3 defined by a straight line OD and a straight line OD' is formed as illustrated in FIG. 5C. The visual field range β3 is shifted toward the positive direction in the X-axis (downward relative to the drawing sheet), to include the range γ2 that is invisible in the state illustrated in FIG. 5A. Thus, the translational movement of the head of the user has succeeded in making the range γ2 visible. Still, an out of visual field range γ1' becomes larger than the range γ1 in FIG. 5A, on the upward side relative to the drawing sheet.

According to the above described viewing state of looking through the eyepiece window frame 121 in a diagonal direction with the translational movement of the head, the head as a whole is tilted in many cases, in addition to the rotation of the eyeball 114, as mentioned above. This will be described below.

In FIG. 5A to FIG. 5C, the user is in a state of visually recognizing the virtual image 501 on the display element 110, through the eyepiece window frame 121 with his or her eyeball (right eye) on the upward side relative to the drawing sheet.

The user, by looking through, becomes in viewing state as described above transitions to the state in FIG. 5B from that in FIG. 5A for example. In this process, the looking through is achieved in many cases not only with the rotation of the eyeball (right eye) on the upward side relative to the drawing sheet looking through the eyepiece window frame 121, but also with the tilting of the head as a whole, as indicated by a reference sign θh. In this case, when the user is wearing an optical member such as eyeglasses, the inclination θh of the head involves an inclination of the eyeglasses 144 changing in the same direction as illustrated in FIG. 5B. Thus, the inclination of the eyeglasses 144 relative to the optical axis changes, then the position of the ghost, produced by the reflection of the light from the illuminants 113a to 113d on the surface of the eyeglasses 144, also changes accordingly.

Figure 6:
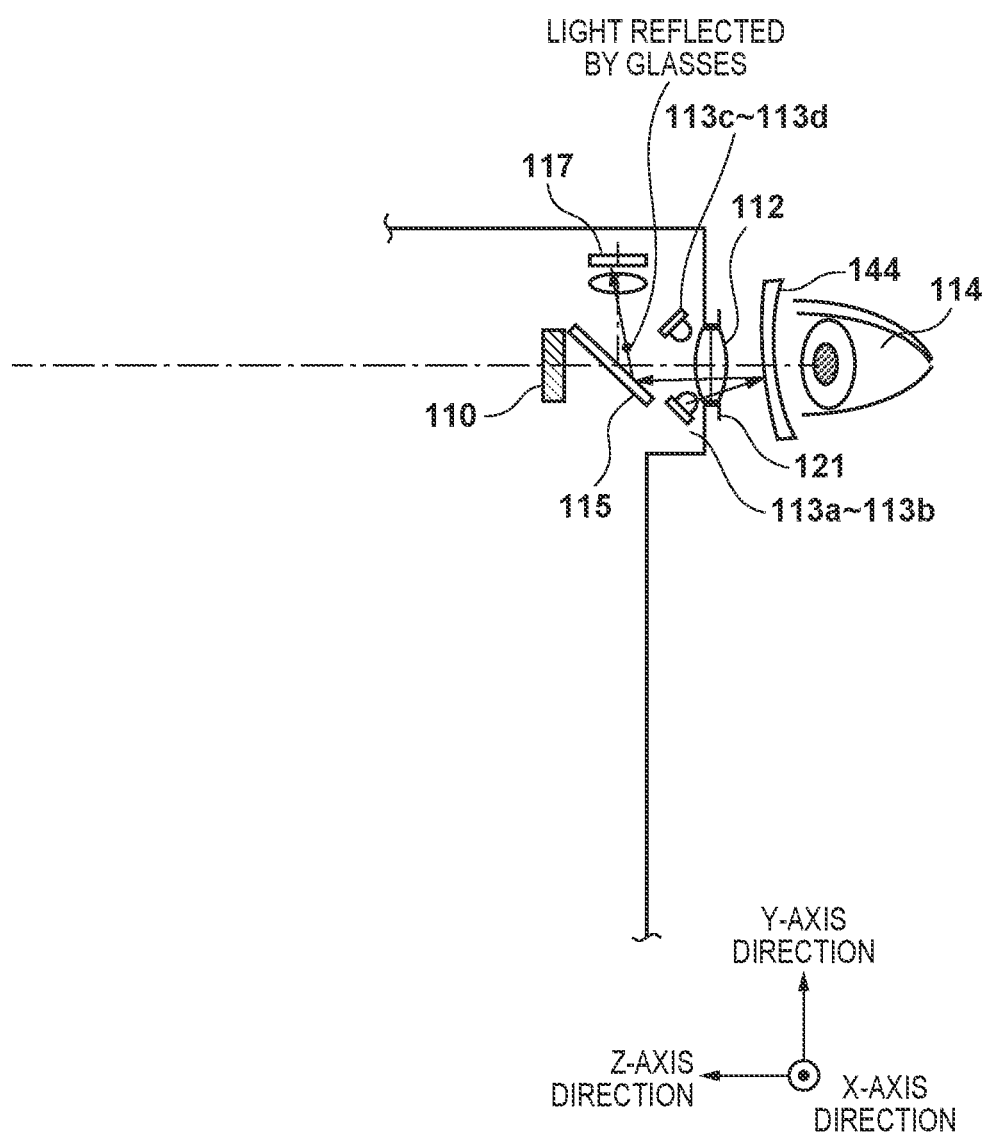
FIG. 6 is a diagram illustrating reflected light that is light from an illumination light reflected on an eyeglass surface.

This ghost is produced when the light emitted from the illuminants 113a to 113d is reflected on the eyeglasses 144, and the reflected light is incident on the eyeball image sensor 117 as indicated by an arrow in FIG. 6. While FIG. 6 illustrates an example of a path of light from the illuminant 113a or 113b, the light from the illuminants 113c and 113d may be similarly incident on the eyeball image sensor 117.

Figure 7A:
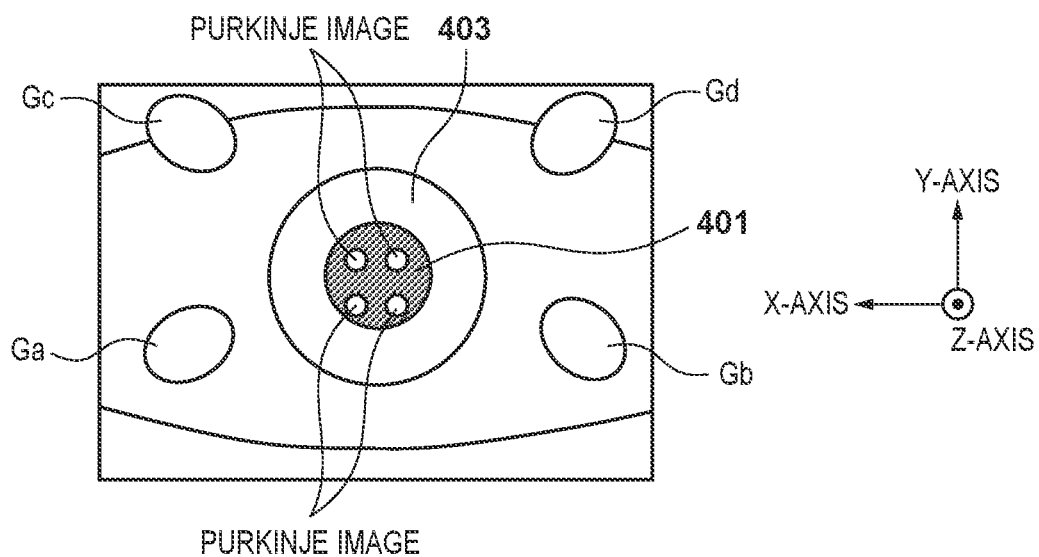
FIG. 7A and FIG. 7B are diagrams illustrating a state where a ghost is produced in an eyeball image.

The ghost described above appears in an eyeball image illustrated in FIG. 7A, as indicated by Ga, Gb, Gc, and Gd, for example. These are ghosts produced from the light emitted from the illuminants 113a, 113b, 113c, and 113d being reflected on the surface of the eyeglasses 144, and appear separately from a Purkinje image produced by the reflection of light from the illuminants on the surface of the cornea of the eyeball 114. These ghosts are substantially symmetrical in the lateral direction, when the optical member such as eyeglasses 144 worn by the user is facing the front.

Figure 7B:
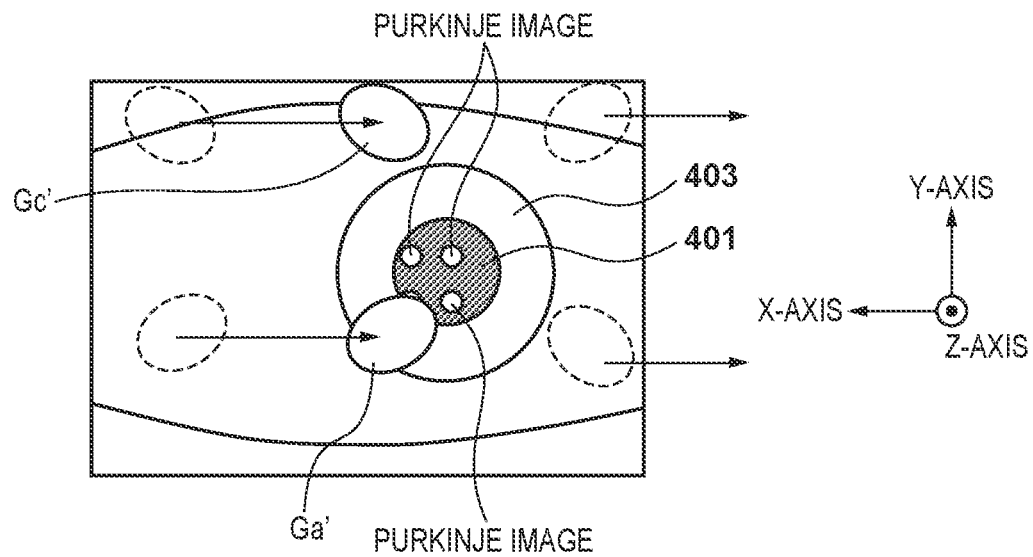

On the other hand, the inclination θh of the head as described above causes a movement of the ghosts, produced on the eyeball, toward the right direction relative to the drawing sheet as illustrated in FIG. 7B. In this case, the ghost Ga' produced by the illuminant 113a, for example, may overlap with the image of the pupil 401 in a region around the center of the eyeball image as illustrated, to render the pupil image partially invisible. The pupil image thus being partially invisible causes a problem in that the accuracy of the personal authentication is compromised due to an incomplete eyeball image.

In the present embodiment, the ghost, which is a factor of the compromised accuracy of the known personal authentication, is used for the personal authentication, to improve the accuracy of the authentication. In the present embodiment, ghost-based estimation on the type of eyeglasses is performed using a learned model obtained by deep learning. Although an example where information of the type of eyeglasses is estimated is described in the present embodiment, the target is not limited to the type of eyeglasses, and the ghost-based estimation may be performed for other information on eyeglasses, such as reflectance, refractive index, and color.

A description will be given below on a method of analyzing and estimating the type of eyeglasses, with an image obtained from the eyeball image sensor 117, as input information, to a convolutional neural network (hereinafter, referred to as CNN). By using the CNN, the detection can be performed with a higher accuracy.

The basic configuration of the CNN will be described with reference to FIG. 8A to FIG. 8C and FIG. 9.

FIG. 8A is a diagram illustrating a basic configuration of a CNN for estimating the type of eyeglasses from two-dimensional image data input. As the two-dimensional image data to be input, the eyeball image obtained from the eyeball image sensor 117 may be used, but it is more preferable to use an image with a ghost highlighted through a method such as reducing the brightness of the eyeball image as a whole or filtering. This is because the ghost produced by the reflection of light from the illuminant as described above has high luminance, and the determination on the type of eyeglasses, which is the purpose of the CNN illustrated in FIG. 8A, can be performed with a higher accuracy by reducing signals not corresponding to the ghost as much as possible.

The flow of processing of the CNN proceeds toward the right direction, with an input made at the left end. The CNN includes sets that are hierarchically arranged. Each set includes two layers known as a feature detection layer (S layer) and a feature integration layer (C layer).

In the CNN, first of all, based on a feature detected in the preceding layer of hierarchy, the next feature is detected in the S layer. Then, the features detected in the S layer are integrated in the C layer, and transmitted, as the detection result in the current layer of hierarchy, to the next layer of hierarchy.

The S layer includes feature detection cell surfaces respectively detecting different features. The C layer includes a feature integration cell surface which performs pooling of the detection results from the preceding feature detection cell surfaces. In the following, the feature detection cell surface and the feature integration cell surface are collectively referred to as a feature surface, if they need not be particularly distinguished from each other. In the present embodiment, an output layer, which is the final stage layer of hierarchy, includes the S layer only and does not include the C layer.

Feature detection processing with the feature detection cell surface and feature integration processing with the feature integration cell surface will be described in detail with reference to FIG. 9.

The feature detection cell surface includes a plurality of feature detection neurons, which are coupling in a predetermined structure to the C layer of the preceding layer of hierarchy. The feature integration cell surface includes a plurality of feature integration neurons, which are coupled in a predetermined structure to the S layer of the same layer of hierarchy.

Figure 9:
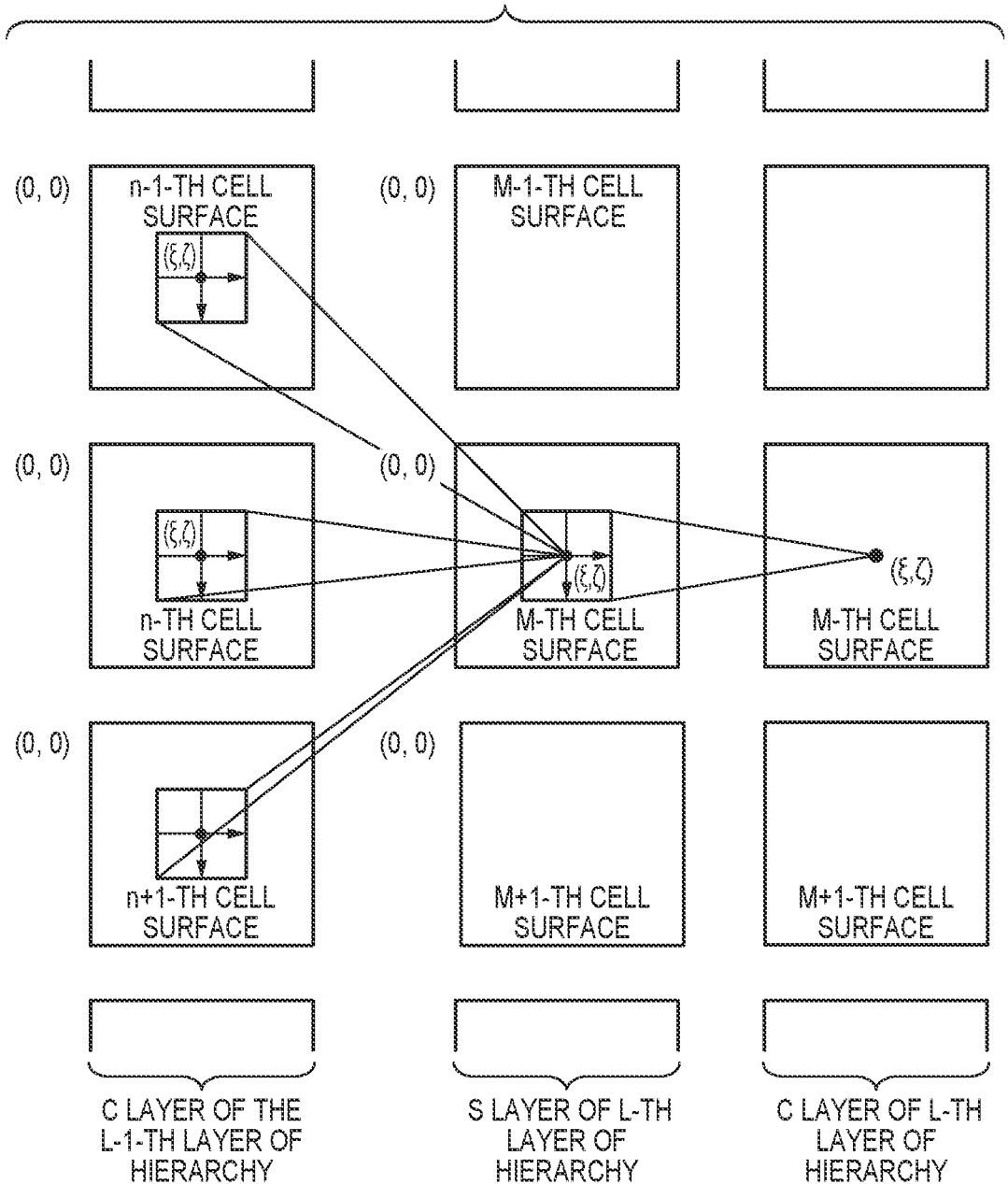
FIG. 9 is a diagram illustrating feature detection processing with a feature detection cell surface and feature integration processing with a feature integration cell surface.

In FIG. 9, $y_M^{LS}(\xi, \zeta)$, denotes an output value of a feature detection neuron at a position $(\xi, \zeta)$ in an M-th cell surface in the S layer of an L-th layer of hierarchy, and $y_M^{LS}(\xi, \zeta)$ denotes an output value of a feature integration neuron at the position $(\xi, \zeta)$ in an M-th cell surface in the C layer of the L-th layer of hierarchy. In this case, the output values can be expressed as follows with $w_M^{LS}(n, u, v)$ and $w_M^{LS}(u, v)$ representing coupling factors of each of the neurons.

$$y_M^{LS}(\xi, \zeta) \equiv f(u_M^{LS}(\xi, \zeta)) \equiv \qquad \text{(Formula 1)}$$

$$f\left\{\sum_{n,u,v} w_M^{LS}(n, u, v) \cdot y_n^{L-1C}(\xi+u, \zeta+v)\right\}$$

$$y_M^{LC}(\xi, \zeta) \equiv u_M^{LC}(\xi, \zeta) \equiv \sum_{u,v} w_M^{LC}(u, v) \cdot y_M^{LS}(\xi+u, \zeta+v) \qquad \text{(Formula 2)}$$

In (Formula 1), f is an activation function, and may be any sigmoid function such as a logistic function or a hyperbolic tangent function, and may be implemented with a tanh function, for example $u_M^{LS}(\xi, \zeta)$ indicates an internal state of the feature detection neuron at the position $(\xi, \zeta)$ in the M-th cell surface in the S layer of the L-th layer of hierarchy. In, (Formula 2) no activation function is used, and a simple linear sum is obtained. When no activation function is used as in (Formula 2), the neuron internal state $u_M^{LS}(\xi, \zeta)$ is equal to the output value $y_M^{LS}(\xi, \zeta)$. Furthermore, $y_n^{L-1C}$ (ξ+u, ζ+v) in (Formula 1) and $y_M^{LS}$(ξ+u, ζ+v) in (Formula 2) are referred to as coupling destination output values of the feature detection neuron and the feature integration neuron, respectively.

Now, a description will be given on ξ, ζ, u, v, and n in (Formula 1) and (Formula 2).

The position (ξ, ζ) corresponds to the position coordinates in the input image. For example, a higher output value of $y_M^{LS}$(ξ, ζ) indicates a higher possibility of detection target feature in the M-th cell surface in the S layer of the L-th layer of hierarchy existing at the pixel position (ξ, ζ) in the input image. In (Formula 2), n indicates an n-th cell surface in a C layer of L-1-th layer of hierarchy, and is referred to as an integration destination feature number. Basically, a multiply-accumulation operation is performed for all the cell surfaces in the C layer of the L-1-th layer of hierarchy. In the formulae, (u, v) represents a relative position coordinates of the coupling factor. The multiply-accumulation operation is performed for a limited range of (u, v) depending on the size of the detected feature. This limited range of (u, v) is referred to as a receptive field. The size of the receptive field is hereinafter referred to as the receptive field size, and is expressed by the number of horizontal pixels×the number of vertical pixels in the coupled range.

According to (Formula 1), in the first S layer corresponding to L=1, $y_n^{L-1C}$(ξ+u, ζ+v) corresponds to an input image $y^{in\_image}$(ξ+u, ζ+v) or an input position map $y^{in\_posi\_map}$(ξ+u, ζ+v). The neurons and the pixels are discretely distributed, and the coupling destination feature numbers are also discrete, and thus u, v, and n are not continuous variables, but are discrete values. Here, and are non-negative integers, n is a natural number, and u and v are integers, all of which are in a limited range.

In (Formula 1), $w_M^{LS}$(n, u, v) represents a coupling factor distribution for detecting a predetermined feature. With the coupling factor distribution adjusted to an appropriate value, the predetermined feature can be detected. The adjustment of the coupling factor distribution is the deep learning. The CNN is established with various test patterns presented to adjust the coupling factor by the coupling factor being repeatedly and gradually corrected to obtain an appropriate output value $y_M^{LS}$(ξ, ζ).

For $w_M^{LS}$(u, v) in (Formula 2), a two-dimensional Gaussian function is used, as expressed in the following (Formula 3).

$$w_M^{LC}(u, v) = \frac{1}{2\pi\sigma_{L,M}^2} \cdot \exp\left(-\frac{u^2+v^2}{2\sigma_{L,M}^2}\right) \quad \text{(Formula 3)}$$

Here also, (u, v) is in the limited range which is referred to as the receptive field, and the size of the range is referred to as the receptive field size, as in the description on the feature detection neuron. This receptive field size may be set to an appropriate value in accordance with the size of the M-th feature in the S layer of the L-th layer of hierarchy. In (Formula 3), σ represents a feature size factor, which may be set to an appropriate constant depending on the receptive field size. Specifically, the value may be set in such a manner that a value on the outermost side of the receptive field can be regarded as being approximately 0.

The CNN according to the present embodiment illustrated in FIG. 8A is configured in such a manner that the calculation described above is performed in each layer of hierarchy and the type of the eyeglasses is determined in the S layer of the final layer of hierarchy.

With such a determination, the ghost-based determination on the eyeglass type can be implemented. Note that in the present embodiment, a learning model including the CNN for estimating the type of eyeglasses described above is a learned model that is completed the deep learning in advance using two-dimensional image data as an input and types of eyeglasses as supervisory data.

FIG. 8B is a diagram illustrating a configuration of a CNN for determining personal authentication. The CNN illustrated in FIG. 8B is input with the eyeball image obtained from the eyeball image sensor 117 and the result of determination on the eyeglass type in FIG. 8A that is eyeglass specific information. Difference in the configuration of and a flow of processing of the CNN illustrated in FIG. 8B from those in FIG. 8A is only input and the others are similar, and thus the description thereof will be omitted.

With personal authentication using the eyeball image only, an incomplete eyeball image due to the ghost causes compromised identification accuracy. On the other hand, when the information on the type of eyeglasses and the eyeball image are both used as described above, the personal authentication accuracy can be improved. Here, in the present embodiment, the learning model including the CNNs for performing determination for the personal authentication described above is a learned model obtained by deep learning completed with the eyeball image and the type of the eyeglasses being input, and with the information for identifying the individual used as supervisory data. The learned model described above outputs information for identifying a person who is the same as the supervisory data. Thus, the personal authentication succeeds when a comparison between the data and information for identifying the person registered in advance indicates a match. However, the method for the personal authentication is not limited to this procedure. For example, a comparison between the output of the learned model in the later stage and the information for identifying the person registered in advance may be incorporated into the learned model. In this case, the learning is, for example, performed with the eyeball image and the eyeglass type used as inputs and information indicating whether or not the personal authentication is successful used as supervisory data.

Figure 10:
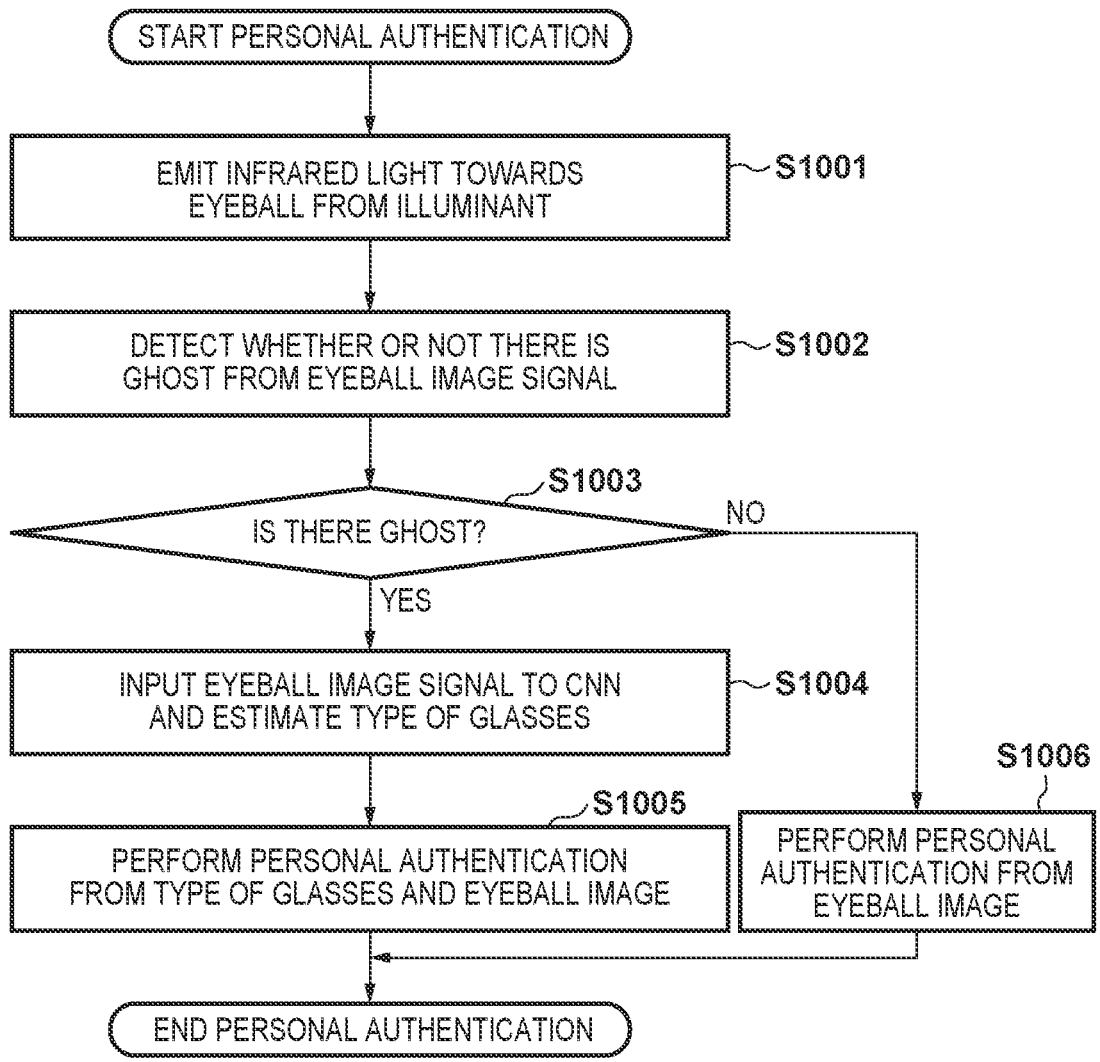
FIG. 10 is a flowchart illustrating personal authentication processing according to the first embodiment.

FIG. 10 is a flowchart illustrating a flow of control for performing personal authentication, in the camera main body 100A.

In step S1001, the CPU 103 turns ON the illuminants 113a and 113b to emit infrared light toward the eyeball 114 of the user. The reflected light from the eyeball 114 of the user illuminated by the infrared light is formed as an image on the eyeball image sensor 117 through the light receiving lens 116. Then, the eyeball image sensor 117 performs photoelectric conversion, so that the eyeball image can be processed as an electrical signal.

In step S1002, the CPU 103 determines whether or not the eyeball image signal obtained includes a ghost. Whether there is a ghost can be determined by checking whether there is a high-luminance pixel other than those corresponding to a Purkinje image, in the eyeball image signal. More specifically, whether there is a ghost can be determined by determining whether there is a high-luminance pixel other than those corresponding to the Purkinje image, because as described above with reference to the principle of the production of ghost, the ghost has a size and a shape different from those of the Purkinje image.

In step S1003, the CPU 103 advances the proceeding to step S1004 upon determining that there is a ghost, and advances the processing to step S1006 upon determining that there is no ghost.

In step S1004, the CPU 103 inputs the eyeball image signal to the CNN illustrated in FIG. 8A, to estimate the type of the eyeglasses.

In step S1005, the CPU 103 inputs the information on the type of eyeglasses for the eyeglass specific information as the first input, and inputs the eyeball image as the second input, to the CNN illustrated in FIG. 8B, to perform the personal authentication.

On the other hand, in step S1006, the CPU 103 performs the personal authentication with the eyeball image signal input to the CNN illustrated in FIG. 8B, because it has been determined that there is no ghost. Note that, while the CNN in FIG. 8B requires an input of the eyeglass specific information, in step S1006, the absence may be input as the eyeglass specific information. As another method, the personal authentication may be performed with a CNN for a case without eyeglasses provided separately from the CNN illustrated in FIG. 8B. The CNN for a case without eyeglasses may be configured to perform personal identification using the input image only, and not using the eyeglass specific information for the input.

As described above, degradation of the accuracy of personal authentication can be suppress even when a ghost is produced due to eyeglasses, with the personal authentication performed using the information on the type of eyeglasses based on the feature of the ghost in addition to the eyeball image.

Second Embodiment

In the present embodiment, an accuracy of the authentication is improved in a case where a ghost is produced, by performing final personal authentication using a result of personal authentication with an eyeball image and a result of personal authentication with information on a feature of a ghost.

In the present embodiment, a CNN similar to that illustrated in FIG. 8A is used to estimate the type of eyeglasses. Furthermore, a CNN similar to that illustrated in FIG. 8B is used to perform personal estimation based on an eyeball image only, without using the eyeglass specific information for the input, as in step S1006 in FIG. 10. Furthermore, personal estimation is performed with the CNN illustrated in FIG. 8C, using the information on the type of eyeglasses obtained by the CNN illustrated in FIG. 8A. Then, the final personal authentication is performed using the result of personal estimation obtained with the CNN illustrated in FIG. 8B and the result of the personal estimation obtained with the CNN illustrated in FIG. 8C. Difference in the configuration of and a flow of processing of the CNN illustrated in FIG. 8C from those in FIG. 8A is only input and the others are similar, and thus the description thereof will be omitted.

Figure 11:
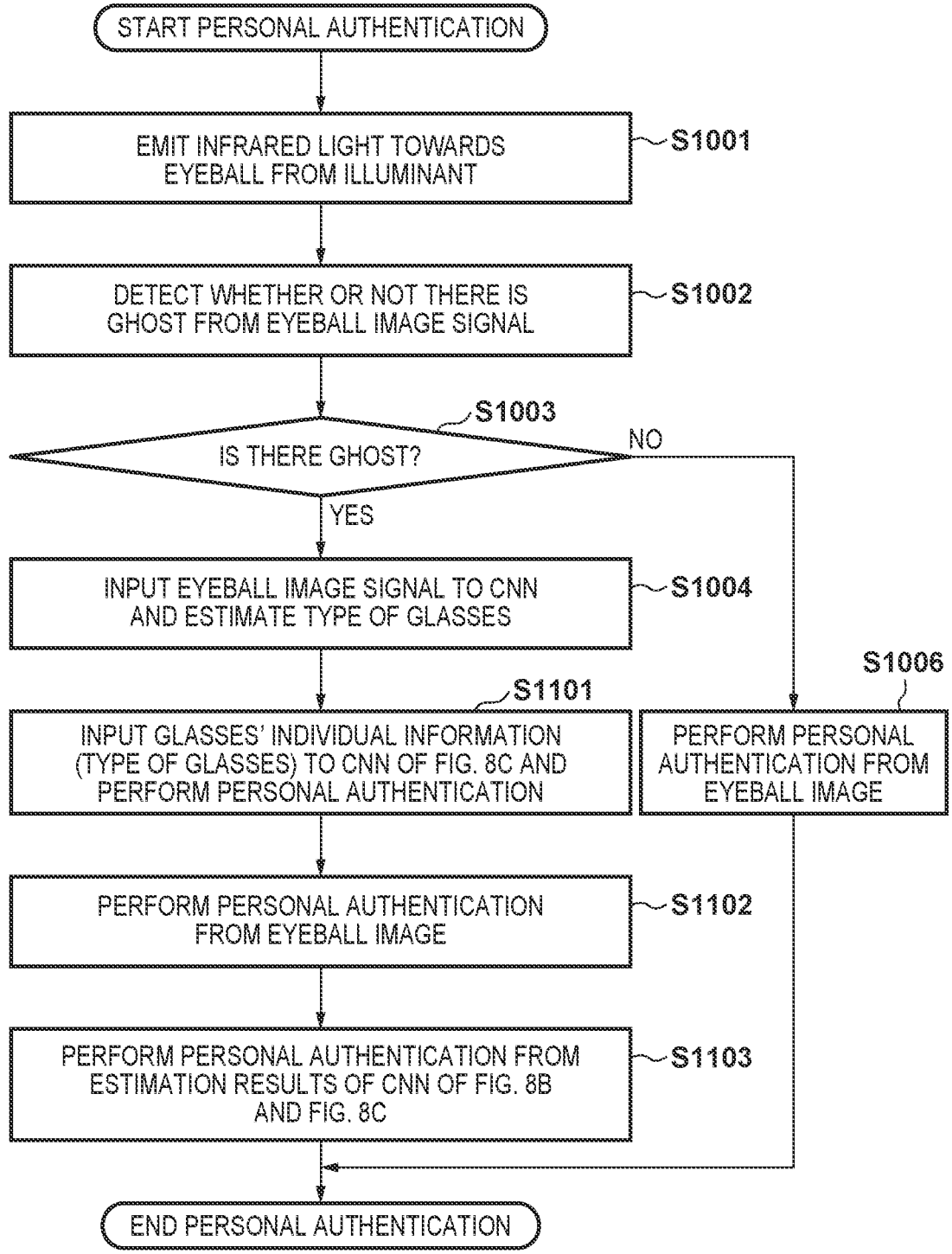
FIG. 11 is a flowchart illustrating personal authentication processing according to a second embodiment.

FIG. 11 is a flowchart illustrating a flow of control for performing personal authentication according to the second embodiment, in the camera main body 100A.

Steps S1001 to S1004 and step S1006, with the numbers that are same as those in FIG. 10, are similar to those in FIG. 10 illustrating the first embodiment.

In step S1101, the CPU 103 inputs the type of eyeglasses acquired by the CNN in FIG. 8A in step S1004 into the CNN in FIG. 8C, and performs personal estimation.

In step S1102, a CNN similar to that illustrated in FIG. 8B is used to perform personal estimation from an eyeball image only, without using the eyeglass specific information for the input, as in step S1006 in FIG. 10.

In step S1103, the CPU 103 performs personal authentication using the result of the personal estimation in step S1101 and the result of the personal estimation in step S1102. As a specific example, the personal authentication may be performed through a method including weighting the two estimation results, multiplying each estimation result by a coefficient and summing the estimation results. However, the determination method for personal authentication using two estimation results is not limited to this, and may be changed as appropriate.

On the other hand, when there is no ghost in step S1003, the eyeball image would not be incomplete, and thus the CPU 103 performs the personal estimation by using the CNN in FIG. 8B using only the eyeball image as the input in step S1006, as in step S1006 in FIG. 10.

As described above, the accuracy of the personal authentication can be improved in a case where a ghost is produced due to eyeglasses, by individually performing the personal estimation using an eyeball image and the personal estimation using the information on a feature of the ghost, and then performing the personal authentication using each of the estimation results.

Third Embodiment

In the present embodiment, a description will be given on a method of solving, using the personal authentication technique described in the first embodiment, a task related to a line-of-sight correction coefficient for the line-of-sight detection in a case where the subject is wearing eyeglasses.

The rotation angles θx and θy of the optical axis of the eyeball 114 are described to be obtained with reference to FIGS. 4A and 4B in the first embodiment. Here, a method of calculating gaze point coordinates and the line-of-sight correction coefficient will be described.

Using the rotation angles θx and θy of the optical axis of the eyeball, the position, on the display element 110, of the line-of-sight of the user (the position of the point that is gazed at. Hereinafter, referred to a gaze point). The gaze point position represented by coordinates (Hx, Hy) corresponding to the center c of the pupil 401 on the display element 110 can be calculated as follows.

$$Hx = m \times (Ax \times \theta x + Bx)$$

$$Hy = m \times (Ay \times \theta y + By)$$

In the formulae, the coefficient m is a constant determined depending on the configuration of the camera finder optical system, and is a conversion coefficient for converting the rotation angles θx and θy into the positional coordinates corresponding to the center c of the pupil 401 on the display element 110. The coefficient m is assumed to be determined and stored in the memory unit 104 in advance. Also in the formulae, Ax, Bx, Ay, and By are line-of-sight correction coefficients for correcting differences in line-of-sight among users, are acquired through a calibration operation described below, and are assumed to be stored in the memory unit 104 before the line-of-sight detection routine starts.

For the user not wearing eyeglasses, the line-of-sight correction coefficient can be obtained as described above. However, a user wearing eyeglasses may use a plurality of types of eyeglasses. Since the shape of the lens is different among the types of eyeglasses, the appropriate line-of-sight correction coefficient differs among the types of eyeglasses. Thus, for the user wearing eyeglasses, the line-of-sight detection needs to be performed by selecting an appropriate one of a plurality line-of-sight correction coefficients for each of the types of eyeglasses.

The method of achieving this will be described below.

First, a method of basic line-of-sight detection and calibration required for calculating the line-of-sight correction coefficients will be described.

FIG. 12A to FIG. 12C are diagram illustrating the visual field in the finder, and illustrate an operation state of the display element 110.

In FIG. 12A to FIG. 12C, the reference sign 1210 denotes a viewing field mask, and the reference sign 1220 denotes a focus detection region. Furthermore, the reference signs 1230-1 to 1230-180 denote 180 focus area objects that are positions, corresponding to a plurality of focus detection points on an imaging plane, displayed by overlapping on a through-the-lens image displayed on the display element 110. A frame for an index corresponding to the currently estimated gaze point position among the indices is displayed as an estimated gaze point A.

Figure 13:
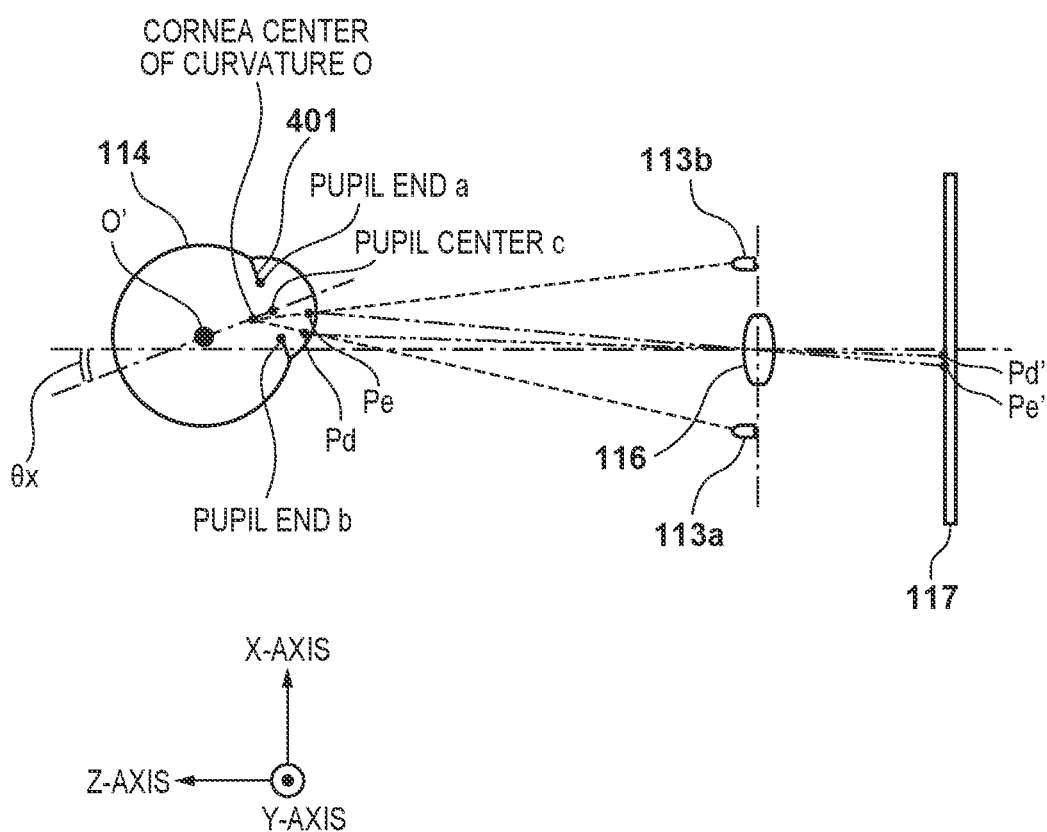
FIG. 13 is a diagram illustrating a principle of a line-of-sight detection method according to the third embodiment.

FIG. 13 is a diagram illustrating the principle of the line-of-sight detection method, and illustrates a schematic configuration of an optical system for performing the line-of-sight detection in FIG. 2.

In FIG. 13, the illuminants 113a and 113b such as light emitting diodes emit infrared light that cannot be sensed by the user. The illuminants 113a and 113b illuminate the eyeball 114 of the user while being substantially symmetrically arranged relative to the optical axis of the light receiving lens 116. Part of the illumination light reflected on the eyeball 114 is focused on the eyeball image sensor 117 by the light receiving lens 116.

As described in the first embodiment with reference to FIG. 4A and FIG. 4B, the rotation angles θx and θy of the optical axis of the eyeball is acquired from the eyeball image in the line-of-sight detection. Then, the calculation for converting the pupil center position into coordinates of the corresponding position on the display element 110 is performed to estimate the gaze point position.

Unfortunately, due to factors such as a difference in eyeball shape among persons and a difference in the shape among the types of eyeglasses, an estimated gaze point C calculated is deviated from the actual gaze position B as illustrated in FIG. 12B, unless the line-of-sight correction coefficients Ax, Ay, Bx, and By are adjusted to appropriate values. FIG. 12B illustrates an example of a state where the user is gazing at a person at the position B, but the camera has made an incorrect estimation that the background is gazed at, thus appropriate focus detection and adjustment cannot be performed.

In view of this, the calibration operation needs to be performed to acquire the appropriate line-of-sight correction coefficient for the user and the eyeglasses used, and store the coefficient in the camera, before an image is captured by the camera.

A known calibration operation is performed by making a user look at a plurality of different highlighted indices displayed at different positions in the finder visual field as illustrated in FIG. 12C, before image capturing. According to a known technique, the operation is performed as follows. Specifically, the gaze point detection flow is executed with the user gazing at each of the index, and an appropriate line-of-sight correction coefficient is obtained from a plurality of estimated gaze point coordinates calculated and coordinates of each of the indices.

With this calibration performed for each combination of a user and the eyeglasses he or she wearing, the appropriate line-of-sight correction coefficient for use can be stored. In other words, for the user who wears a plurality of types of eyeglasses, the calibration is preferably performed for each type of eyeglasses.

Figure 14:
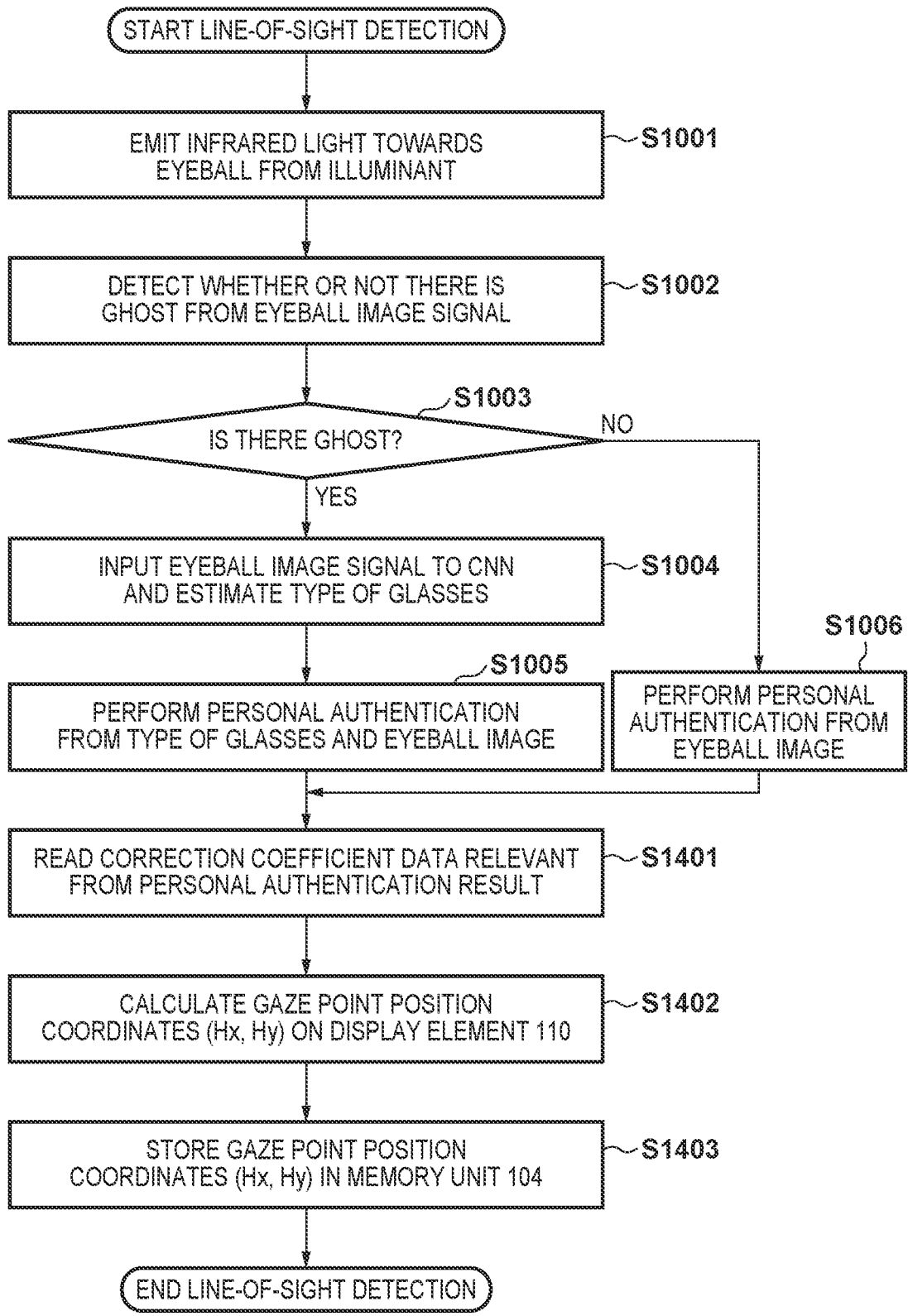
FIG. 14 is a flowchart of line-of-sight detection processing using eyeglass specific information according to the third embodiment.

FIG. 14 is a flowchart illustrating a method of selecting a line-of-sight correction coefficient using a result of personal authentication and a line-of-sight detection operation.

In steps S1001 to step S1006, with the numbers that are same as those in FIG. 10, operations are performed for the personal authentication in the first embodiment which are the same as those in FIG. 10.

In step S1401, the CPU 103 reads relevant line-of-sight correction coefficients from the memory unit 104 based on the personal authentication result obtained in step S1005 or S1006. The relationship between the personal authentication result and the line-of-sight correction coefficient will be described with reference to FIG. 15. The task of the third embodiment lies in the fact that the appropriate line-of-sight correction coefficient varies, when an eyeglass wearing user uses a plurality of types of eyeglasses. In view of this, as illustrated in FIG. 15, the line-of-sight correction coefficient is associated with the type of the eyeglasses in addition to the personal authentication result. This makes it possible to manage the correction coefficient usable for a case where a plurality of types of eyeglasses are used, and read such a line-of-sight correction coefficient.

In step S1402, the CPU 103 calculates the gaze point coordinates (Hx, Hy) corresponding to the center c of the pupil 401 on the display element 110 as described above using the line-of-sight correction coefficient obtained in step S1401.

In step S1403, the CPU 103 stores the gaze point coordinates thus calculated in the memory unit 104, and terminates the line-of-sight detection routine.

As described above, according to the present embodiment, it is possible to obtain appropriate gaze point coordinates by using appropriate line-of-sight correction coefficient associated with each person and the type of eyeglasses.

Although preferred embodiments of the present invention have been described above, the present invention is not limited to such embodiments, and various modifications and changes can be made within the scope of the gist of the invention.

For example, according to the configuration of the embodiments described above, the CNN is used for the personal authentication. However, the use of the CNN should not be construed in a limiting sense. For example, personal identification may be performed by extracting information on a feature of an iris such as an iris code from an eyeball image, and performing pattern matching using this information and the information on the type of eyeglasses. The pattern matching may also be used for the estimation on the type of the eyeglasses.

Other Embodiments

The present invention can also be implemented through processing including supplying a program for implementing one or more functions of the embodiments described above to a system or an apparatus by using a network or a storage medium, and reading and executing, by a computer of the system or the apparatus, the program. The computer includes one or a plurality of processors or circuits, and may include a network of a plurality of individual computers or a plurality of individual processors or circuits, to read and execute a computer-readable instruction.

The processor or the circuit may include a central processing unit (CPU), a micro processing unit (MPU), a graphics processing unit (GPU), an application specific integrated circuit (ASIC), and a field programmable gateway (FPGA). The processor or circuit may further include a digital signal processor (DSP), a data flow processor (DFP), or a neural processing unit (NPU).

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-148078, filed Sep. 10, 2021, which is hereby incorporated by reference herein in its entirety.

What is claimed is:

1. A personal authentication apparatus comprising:
at least one processor or circuit configured to function as:
an acquisition unit configured to acquire an eyeball image of a user;
an estimation unit configured to estimate, based on a ghost captured in the eyeball image, information on eyeglasses worn by the user; and
an authentication unit configured to perform personal authentication on the user based on the eyeball image and the information on the eyeglasses,
wherein the authentication unit performs first identification of identifying a person using the information on the eyeglasses and second identification of identifying the person using the eyeball image, and performs the personal authentication using results of the first identification and of the second identification.

2. The personal authentication apparatus according to claim 1, wherein the information on the eyeglasses is information on a type of the eyeglasses.

3. The personal authentication apparatus according to claim 1, wherein the at least one processor or circuit is configured to further function as
a determination unit configured to determine whether or not a ghost is produced in the eyeball image, wherein when the determination unit determines that the ghost is not produced, the authentication unit performs the personal authentication on the user based only on the eyeball image.

4. The personal authentication apparatus according to claim 1, wherein the authentication unit performs the personal authentication by using a neural network obtained by deep learning.

5. The personal authentication apparatus according to claim 1, wherein the estimation unit estimates the information on the eyeglasses by using a neural network obtained by deep learning.

6. The personal authentication apparatus according to claim 1, wherein the authentication unit extracts a feature from the eyeball image and performs the personal authentication by using pattern matching.

7. The personal authentication apparatus according to claim 1, wherein the estimation unit estimates the information on the eyeglasses using pattern matching based on the eyeball image.

8. The personal authentication apparatus according to claim 1, wherein the eyeball image is an image at least including an iris being captured.

9. The personal authentication apparatus according to claim 1, wherein the authentication unit performs the personal authentication, by weighting and summing the results of the first identification and of the second identification.

10. The personal authentication apparatus according to claim 1, wherein the information on the eyeglasses is used as input information for deep learning for the personal authentication.

11. The personal authentication apparatus according to claim 1, further comprising an illumination device configured to illuminate an eyeball of the user using infrared light.

12. The personal authentication apparatus according to claim 11, wherein the illumination device includes at least two light sources.

13. The personal authentication apparatus according to claim 12, wherein the at least one processor or circuit is configured to further function as
a line-of-sight detection unit configured to detect a line-of-sight from the eyeball image obtained with the illumination device performing the illumination; and
a storage unit configured to store a correction coefficient corresponding to a difference among users and the information on the eyeglasses,
wherein when same user wears different types of eyeglasses, the line-of-sight detection unit detects a line-of-sight by using the correction coefficient corresponding to the information on the eyeglasses.

14. A personal authentication method comprising:
acquiring an eyeball image of a user;
estimating, based on a ghost captured in the eyeball image, information on eyeglasses worn by the user; and
performing personal authentication on the user based on the eyeball image and the information on the eyeglasses,
wherein in the performing personal authentication, first identification of identifying a person using the information on the eyeglasses and second identification of identifying the person using the eyeball image are performed, and the personal authentication using results of the first identification and of the second identification is performed.

15. A non-transitory computer readable storage medium storing a program causing a computer to function as each unit of a personal authentication apparatus, the apparatus comprising:
at least one processor or circuit configured to function as:
an acquisition unit configured to acquire an eyeball image of a user;
an estimation unit configured to estimate, based on a ghost captured in the eyeball image, information on eyeglasses worn by the user; and
an authentication unit configured to perform personal authentication on the user based on the eyeball image and the information on the eyeglasses,
wherein the authentication unit performs first identification of identifying a person using the information on the eyeglasses and second identification of identifying the person using the eyeball image, and performs the personal authentication using results of the first identification and of the second identification.

* * * * *